March 2, 1954  T. J. WHITECHESTER  2,670,637
DRILL GUIDE
Filed July 18, 1951
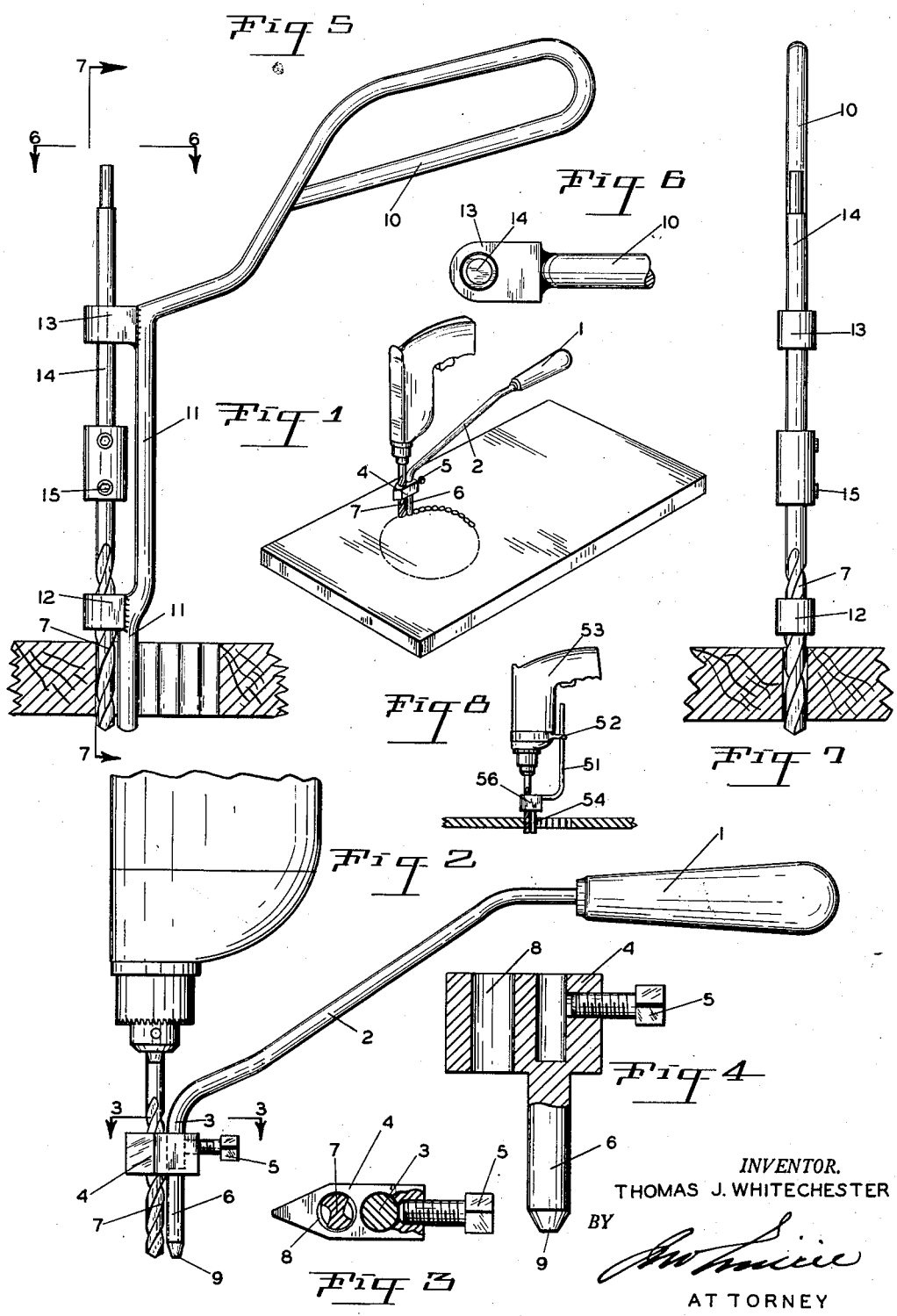
INVENTOR.
THOMAS J. WHITECHESTER
BY
ATTORNEY Patented Mar. 2, 1954

2,670,637

UNITED STATES PATENT OFFICE 2,670,637

DRILL GUIDE

Thomas J. Whitechester, Yakima, Wash., assignor of one-half to Frank M. Hardy, Yakima, Wash.

Application July 18, 1951, Serial No. 237,315

1 Claim. (Cl. 77—55)

This invention relates to hole cutting devices and is particularly adapted to guide drills in cutting holes in metal plates and the like.

The primary object of the invention is to provide a device for guiding drills on a predetermined line, employing the last hole drilled for positioning the drill relative to the said line in drilling the next hole.

A further object of the invention is the provision of a device for guiding the drill in drilling holes that can be operated by one hand, leaving the other hand of the operator free to operate the drill.

These and other incidental objects will be apparent in the drawings, specification and claim.

Referring to the drawings:

Figure 1 shows my new and improved hole cutting device in operation.

Figure 2 is a side view of the device applied to a power drill.

Figure 3 is a plan sectional view, taken on line 3—3 of Figure 2.

Figure 4 is a sectional view of the drill guiding unit removed from the handle.

Figure 5 is another preferred form of hole cutting device.

Figure 6 is an enlarged fragmentary plan view, taken on line 6—6 of Figure 5.

Figure 7 is an end view, taken on line 7—7 of Figure 5.

Figure 8 is another preferred method of guiding the drill from the previously drilled hole in the material.

Referring more specifically to the drawings:

My new and improved hole cutting device consists of a handle 1 inclined at 2 and terminating in a vertical post or member 3. A drill guide member 4 is fixedly secured to the post 3 by the set screw 5.

Forming part of and extending downwardly is a post or guide 6. This post or guide is adapted to enter the hole previously drilled by the drill 7. The guide member 4 has a second guide hole 8 passing therethrough on a vertical plane or parallel to the post 6, which is adapted to receive the drill 7.

In operation of the device, referring to Figure 1, the last hole drilled provides a guide into which the post 6 enters and by swinging the handle 1 in either direction, the drill 7 will be guided relative to the last hole drilled. This may take the form of a circle as indicated, or it may take the form of any irregular or straight line, the handle determining the direction that the cut is to be made by the drill.

The size of the post 6 and the hole 8 may be varied depending on the size holes to be drilled, or the size of drill may be a constant size, the one best suited to the work being performed. The point 9 assists in the guiding of the drill over the line to be followed.

In Figures 5, 6 and 7 I illustrate another preferred form of hole cutting device. The handle 10 and the vertical post 11 is formed from one piece having a drill guide 12 located at the lower end of the post 11, and an extension shaft guide 13 formed at the upper part of the post 11. The drill is held to the guide shaft 14 by the set screw 15. This form of construction is simple and accurate in its operation.

Referring to Figures 1 and 5, it can be readily understood that the drill will be guided by the previous hole having been drilling by simply swinging the handle of the device so as to drop the drill on the line having been scribed.

Referring to Figure 8, the drill guide 50 is controlled by the crank 51 which extends upwardly operating within the guide member 52 forming part of the power drill 53. The pivot pin 54 forming part of the drill guide 50 passes down through the previous drilled hole and by rotating the handle 53 one way or another the position of the drill can be controlled on the line as indicated in Figure 1. This of course eliminates the handle 1 described in the other views, but it works exceptionally well.

What I claim is:

A tool for forming a series of communicating holes corresponding to a pattern in a sheet of material to cut out a section of the material to form an opening, comprising a vertical member, the outer end of which is formed in a handle and the lower end of which is formed in a guide pin, a pair of lugs projecting from the vertical member, the lugs having aligned bores adjacent to and parallel with the guide pin, a drill fitted in the aligned bores, the drill below the supports being in substantial contact with the guide pin, whereby the guide pin can be inserted in a hole made on the pattern and the handle turned to position the drill on the pattern to drill another of a succession of holes following the pattern, the holes bisecting each other to sever a section of the material to accord with the pattern to form an opening in said material.

THOMAS J. WHITECHESTER.

References Cited in the file of this patent

UNITED STATES PATENTS

| Number | Name | Date |
|---|---|---|
| 560,824 | Tattersall | May 26, 1896 |
| 2,466,023 | Griffin | Apr. 5, 1949 |
| 2,612,793 | Timpner | Oct. 7, 1925 |

FOREIGN PATENTS

| Number | Country | Date |
|---|---|---|
| 356,942 | Great Britain | Sept. 17, 1931 |